US006970708B1

(12) United States Patent  (10) Patent No.: US 6,970,708 B1
Raith  (45) Date of Patent: Nov. 29, 2005

(54) SYSTEM AND METHOD FOR IMPROVING CHANNEL MONITORING IN A CELLULAR SYSTEM

(75) Inventor: Alex Krister Raith, San Diego, CA (US)

(73) Assignee: Ericsson Inc., Reserach Triangle Park, NC (US)

( * ) Notice: Subject to any disclaimer, the term of this patent is extended or adjusted under 35 U.S.C. 154(b) by 0 days.

(21) Appl. No.: 09/498,772

(22) Filed: Feb. 5, 2000

(51) Int. Cl.[7] ............................................. H04Q 7/20
(52) U.S. Cl. .................. 455/440; 455/441; 455/67.11; 455/115.1
(58) Field of Search ................................ 455/422, 450, 455/452, 436, 438, 456, 435, 406, 433, 453, 455/509, 513, 525, 67.1, 67.3, 62, 63, 574, 455/343, 464, 434; 370/311

(56) References Cited

U.S. PATENT DOCUMENTS

| | | | | |
|---|---|---|---|---|
| 3,913,017 | A | * | 10/1975 | Imaseki ........................ 325/52 |
| 5,179,559 | A | * | 1/1993 | Crisler et al. ................ 370/332 |
| 5,293,641 | A | * | 3/1994 | Kallin ......................... 455/33.1 |
| 5,327,575 | A | * | 7/1994 | Menich et al. ............... 455/437 |
| 5,404,135 | A | | 4/1995 | Janex |
| 5,432,842 | A | * | 7/1995 | Kinoshita et al. ............. 379/60 |
| 5,508,708 | A | * | 4/1996 | Ghosh ......................... 342/457 |
| 5,831,545 | A | * | 11/1998 | Murray et al. |
| RE36,017 | E | | 12/1998 | Uddenfeldt et al. |
| RE36,078 | E | | 2/1999 | Uddenfeldt et al. |
| 5,943,610 | A | * | 8/1999 | Endo |
| 5,991,622 | A | * | 11/1999 | Henry ........................ 455/434 |
| 6,014,565 | A | * | 1/2000 | Bonta .......................... 455/437 |
| 6,052,597 | A | * | 4/2000 | Ekstrom .................... 455/456.1 |
| 6,061,337 | A | * | 5/2000 | Light et al. .................. 370/331 |
| 6,118,977 | A | | 9/2000 | Vannucci |
| 6,122,514 | A | * | 9/2000 | Spaur ......................... 455/448 |
| 6,134,446 | A | * | 10/2000 | Sasuta et al. |
| 6,161,015 | A | * | 12/2000 | Birchler et al. ............. 455/438 |
| 6,167,268 | A | * | 12/2000 | Souissi et al. |
| 6,167,274 | A | * | 12/2000 | Smith ......................... 455/456 |
| 6,181,956 | B1 | * | 1/2001 | Koskan ...................... 455/11.1 |
| 6,192,246 | B1 | * | 2/2001 | Satarasinghe ............... 455/436 |
| 6,256,500 | B1 | * | 7/2001 | Yamashita .................. 455/437 |
| 6,259,924 | B1 | * | 7/2001 | Alexander et al. .......... 342/457 |
| 6,263,064 | B1 | * | 7/2001 | O'Neal ....................... 379/201 |

(Continued)

FOREIGN PATENT DOCUMENTS

EP 1037477 A1 2/2000

(Continued)

*Primary Examiner*—Temica Beamer
(74) *Attorney, Agent, or Firm*—Coats & Bennett, P.L.L.C.

(57) ABSTRACT

The present invention relates to a mobile station capable of determining its current location within a wireless communication system. The mobile station periodically generates an estimate of its current location or mobility and then monitors channels for channel selection based thereon in order to minimize frame stealing while in active mode and save energy during idle mode. The same information is also useful for determining which cells to monitor and controlling how frequently position or changes of position estimates are made. Although the invention requires a determination of the mobile station's position or mobility, the manner in which the mobile station determines these characteristics may vary. A separate positioning receiver, terrestrial or satellite based, such as that used with the Global Positioning System, may allow the mobile station to calculate its position. Alternatively, the mobile station may monitor signals provided during communications with the base stations to calculate a relative position. In yet another embodiment, the base stations and associated cellular systems may cooperate to determine a particular mobile station's position and then download the position to the mobile station.

21 Claims, 6 Drawing Sheets

U.S. PATENT DOCUMENTS

| | | | |
|---|---|---|---|
| 6,263,209 B1 * | 7/2001 | Reed et al. | 455/404 |
| 6,275,186 B1 * | 8/2001 | Kong | 342/363 |
| 6,295,455 B1 * | 9/2001 | Fischer et al. | 342/450 |
| 6,308,068 B1 * | 10/2001 | Kunkel | 455/434 |
| 6,330,459 B1 * | 12/2001 | Crichton et al. | 455/434 |
| 6,385,460 B1 * | 5/2002 | Wan | 455/515 |
| 6,389,264 B1 * | 5/2002 | Halonen | 370/335 |
| 6,421,328 B1 * | 7/2002 | Larribeau et al. | 370/329 |
| 6,424,837 B1 * | 7/2002 | Hall et al. | 455/404 |
| 6,490,460 B1 * | 12/2002 | Soliman | 455/522 |
| 6,522,888 B1 * | 2/2003 | Garceran et al. | 455/456 |
| 6,539,230 B2 * | 3/2003 | Yen | 455/456.1 |
| 6,564,057 B1 * | 5/2003 | Chun et al. | 455/437 |

FOREIGN PATENT DOCUMENTS

| | | |
|---|---|---|
| GB | 2320654 A | 6/1998 |
| WO | WO99/05878 | 2/1999 |

* cited by examiner

SYSTEM AND METHOD FOR IMPROVING CHANNEL MONITORING IN A CELLULAR SYSTEM

BACKGROUND OF THE INVENTION

The present invention relates generally to the management of mobile stations in a wireless communication system and, more particularly, to a system and method for providing improved channel selection procedures.

In a wireless communication system, the service area is typically divided into a plurality of cells, with each cell served by a base station. Mobile stations within a particular cell communicate over RF channels with the base station serving that cell. The base station may handle a plurality of simultaneous calls from mobile stations. The base stations are connected with one another and to the public switched telephone network by mobile services switching centers (MSC). The MSC coordinates the activities of all the associated base stations and connects the entire cellular system to the public switched telephone network. A typical MSC may handle 100,000 cellular subscribers and 5,000 simultaneous conversations at a time. The MSC also accommodates billing and system maintenance functions. In some higher density networks, several MSCs are used in a single network.

During the course of a call, the mobile station may move from one cell into another. A switching technique called a handoff enables the call to proceed uninterrupted when the user moves between cells. When the mobile station moves into a different cell while a call is in progress, the MSC automatically transfers the call from the current channel being used to a new channel belonging to the base station serving the new cell.

Processing handoffs is an important task in any wireless communication system. Handoffs ensure that acceptable signal quality standards are maintained as the mobile station moves out of range of one base station and into the radio coverage area of another base station. Handoffs should be performed successfully and be imperceptible to the user. Also, because of the signaling demand a handoff places on the system, handoffs should be performed as infrequently as possible and only as needed.

Handoff decisions are typically based on received radio signal strength and channel quality as monitored by the base station serving the mobile station. Received signal strengths are easily monitored and signal quality for any given channel is often determined by the bit error rate (BER) over a given channel. During any communication period, the cellular system will continually seek a better channel and cell for communications. A handoff from the current channel to another channel is initiated when the signal level or channel quality drops below acceptable levels and another channel is available capable of providing acceptable communications.

In digital systems, such as Global System for Mobile communications (GSM) and Time Division Multiple Access (TDMA) systems, the base stations enlist the assistance of the mobile station to determine when a handoff is required. In order to use a mobile station to assist handoff, the serving base station downloads a list of channels, commonly referred to as a neighbor list, at the start of a call or after a handoff. The neighbor list identifies channels in neighboring cells which are potential handover targets. In a mobile assisted handoff (MAHO), each mobile station measures the received power from surrounding base stations provided by the neighbor list, which is also referred to as a MAHO list. The mobile station continually reports the results of these measurements to the serving base station. These reports are often referred to as MAHO reports. The signal strength measurements are made by the mobile station in between periods of communication during a call. For example, in GSM systems, each radio frequency channel is divided into eight time slots. In TDMA systems, each radio frequency channel is divided into six slots. The mobile station is allocated one time slot for transmissions and another time slot to receive signals from the base station. During the remaining time slots, the mobile station is not communicating with the serving base station. The mobile station monitors channels belonging to neighboring base stations during these idle periods and then quickly returns to its assigned channels in time to transmit and receive signals in its allocated time slot. The measurements made by the mobile station of signals received from neighboring cells are reported back to the serving base station in a scheduled manner or on a separate channel so as not to interfere with voice or data transmissions. During multi-slot operation, the time slots normally used for communications are "borrowed" to allow the mobile station to report measurements to the base station. This concept is typically referred to as frame stealing and reduces transmission rates.

The measurement reports provided by the mobile station give the base station a list of the signal strength and possibly channel quality from adjacent cells, as measured by the mobile station at its present location. The network also knows which adjacent cells have unused radio channels that are available for allocation during a handoff. From the list of available channels, the network selects the cell which best will handle the call from a service quality and an overall interference point of view based on signal strength and bit error rate. A suitable traffic channel is assigned that cell as the target, and the mobile station is commanded to retune to the traffic channel in the target cell. At the same time, the call is switched by the MSC to the base station currently serving the mobile station to the base station in the target cell. The mobile station switches to the newly assigned channel during one of the idle periods so there is no interruption in transmission. Thus, from the user's perspective, the handover is seamless.

Cell reselection is the process of changing channels for service and registering with a new base station when the mobile station is not active. When the mobile station is between calls and not actively communicating with a base station, but is ready to receive or place calls, it monitors one or more control channels of proximate base stations to receive paging or other instructions. This state of operation is commonly referred to as the idle state or idle mode. Since there is no two-way communication in place while in idle mode, the cellular system does not know which base station the mobile station should monitor. Typically, the mobile station monitors signal strength along with other indicia indicative of channel quality in order to select a base station. In older analog systems, the selected base station was typically the one providing the strongest signal. In modern digital systems supporting hierarchical cell structures, the mobile station performs a much more elaborate evaluation of candidate cells.

As the mobile station moves throughout areas of coverage for various base stations, it acquires information about channels and their attributes used or associated with surrounding base stations by reading a list of channels sent on a broadcast channel for each cell from which it is able to receive information. This list is also commonly referred to as a neighbor list. The neighbor list identifies specific channels for the mobile station to monitor when idle. In essence, the mobile station monitors the listed channels and decides on the best channel for service. When the mobile station decides a new channel is required, it may send information to the new base station to register and effect cell reselection.

While idle, mobile stations make a tradeoff between accurate neighbor list measurements and energy consumption. U.S. Pat. No. 5,539,748 entitled Enhanced Sleep Mode in Radio Communication Systems discloses a few basic techniques to reduce the neighbor list measurements without sacrificing the quality of these measurements. In essence, the patent describes a very basic system-assisted and a mobile station-controlled method for reducing the number of neighbor list measurements. In the former, the cellular system sends the mobile station the minimum, nominal frequency and measurement for each entry in the neighbor list. The cellular system provides an indication that certain entries can be measured with a reduced frequency. This is applicable if there are many entries in the neighbor list or the entries are in a hierarchical cell layout. In the latter, the mobile allows a reduced measurement frequency from the nominal requirement if no cell reselection has been performed for a specified time. Alternatively, the measurement is reduced if changes of signal strength for the serving control channel and neighbor list entries are less than specified.

A significant amount of system resources and power are used while assisting a base station during handoffs and monitoring nearby stations for cell reselection. Given the premiums placed on getting the most use of allocated bandwidth and extending battery life, there is a need for an improved channel selection system and method to reduce processing time and energy consumption associated with channel selection during active and idle modes without degrading performance.

SUMMARY OF THE INVENTION

In recent years, the cost of manufacturing a global positioning system (GPS) receiver has been reduced to a level that makes it practical to incorporate GPS receivers into consumer electronics. A mobile station equipped with a GPS receiver or similar position determining electronics could provide accurate position information to the mobile station and associated network to assist the network in system management functions, and in particular, assist with channel selection.

The present invention relates to a mobile station capable of determining its current location within a wireless communication system. The mobile station periodically generates an estimate of its current location or mobility and then monitors channels for channel selection based thereon in order to minimize frame stealing while in active mode and save energy during idle mode. The same information is also useful for determining which cells to monitor and controlling how frequently position or changes of position estimates are made. Although the invention requires a determination of the mobile station's position or mobility, the manner in which the mobile station determines these characteristics may vary. A separate positioning receiver, which receives signals from a terrestrial or satellite station, may allow the mobile station to calculate its position. Alternatively, the mobile station may monitor signals provided during communications with the base stations to calculate a relative position. In yet another embodiment, the base stations and associated cellular systems may cooperate to determine a particular mobile station's position and then download the position to the mobile station. Those skilled in the art will recognize numerous techniques for identifying a mobile station's position or mobility and use that information according to the teachings of the present invention. Existing and future position and mobility determining means are considered within the scope of the invention.

Accordingly, each cell in the neighbor or MAHO list may be measured with an independent measurement frequency varying from a nominal default to zero. The cellular system may assist the mobile station with position-related attributes to the entries on the neighbor and MAHO list, such as the position of neighboring cells and the position of the base station's transmitter for that cell. This information, although not limited to, is preferably transmitted on the broadcast channel in a neighbor list or a point-to-point channel in a MAHO list message.

These and other aspects of the present invention will become apparent to those skilled in the art after a reading of the following description of the preferred embodiment when considered with the drawings.

DETAILED DESCRIPTION OF THE INVENTION

Figure 1:
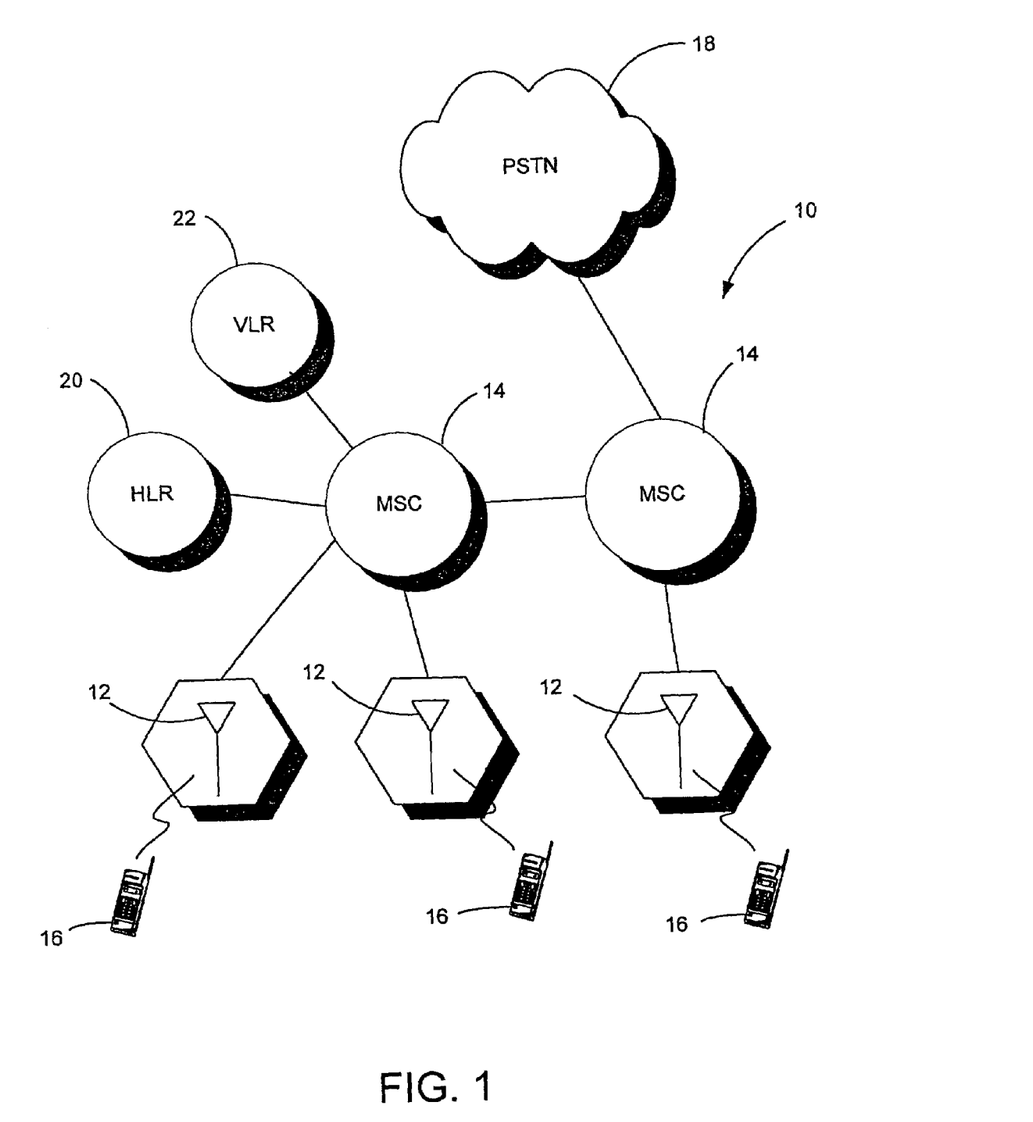
FIG. 1 is a schematic representation of a cellular network.

In the following description, like reference characters designate like or corresponding parts throughout the several views. Referring now to the drawings, the improved channel selection method of the present invention is described. Channel selection according to the present invention is useful in mobile cellular systems like that shown schematically in FIG. 1. The mobile cellular system, which is indicated generally by the numeral 10, includes a plurality of base stations 12, which are connected via a mobile services switching center (MSC) 14 to a terrestrial communications network such as the Public Switched Telephone Network (PSTN) 18. Each base station 12 is located in and provides service to a geographic region referred to as a cell. In general, there is one base station 12 for each cell within a given system. Within each cell, there may be a plurality of mobile stations 16 that communicate via a radio link with the base station 12. The base station 12 allows the user of the mobile station 16 to communicate with other mobile stations 16, or with users connected to the PSTN 18. The mobile services switching center 14 routes calls to and from the mobile station 16 through the appropriate base station 12. Information concerning the location and activity status of the mobile station 16 is stored in a Home Location Register (HLR) 20 and a Visitor Location Register (VLR) 22, which are connected to the MSC 14.

It is worth noting that a different architecture is often used for packet data sessions, such as that used in GPRS and Mobile IP. As such, there may be no involvement from the MSC 14. In essence, the base station 12 is connected to a packet data node, and then to the public packet data network through additional nodes to reach the internet. Furthermore, the concepts of the present invention are applicable to all current and future wireless communication systems, including cdma2000 and WCDMA.

Figure 2A:
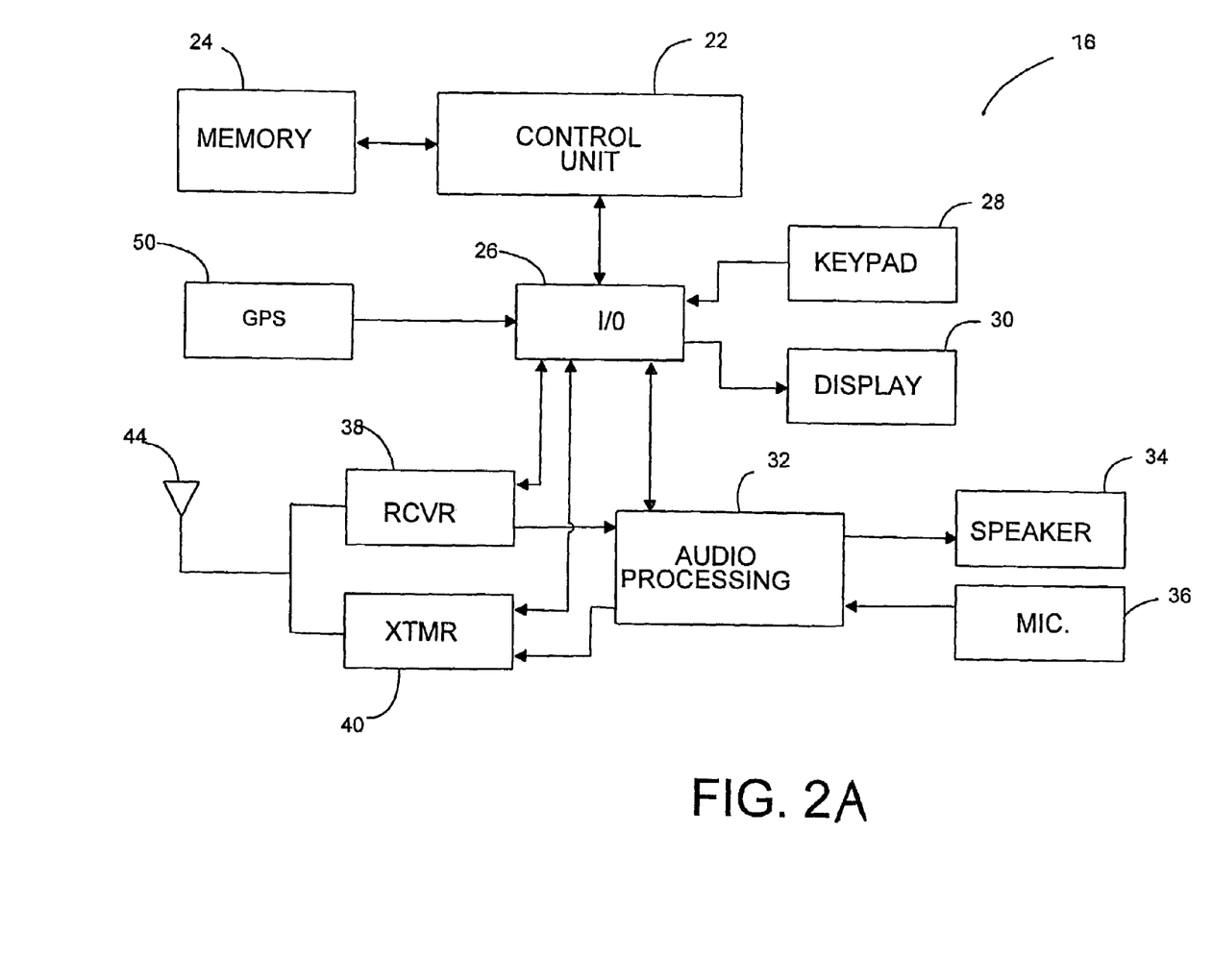
FIG. 2A is a block diagram of a telephone embodiment of a mobile terminal with a positioning receiver.

FIG. 2A is a block diagram of a mobile station 16 adapted to receive position indicia. In particular, the disclosed embodiment of the mobile station 16 is a fully functional cellular telephone, such as an IS95 compliant cellular telephone, capable of transmitting and receiving signals. The cellular telephone 16 includes a control unit 22, which is typically a microcontroller-based system for controlling the operation of the cellular telephone 16, and a memory 24 for storing control programs and data used by the cellular telephone 16 during operation. Input/output circuits 26 interface the microprocessor 22 with a keypad 28, a display 30, audio processing circuits 32, receiver 38, transmitter 40, and positioning receiver 50. The keypad 28 allows the operator to dial numbers, enter commands, and select options. The display 30 allows the operator to see dialed digits, stored information, and call status information. The audio processing circuits 32 provide basic analog audio outputs to a speaker 34 and accept analog audio inputs from a microphone 36. The receiver 38 and transmitter 40 receive and transmit signals using a shared antenna 44. The positioning receiver 50, which may for example be a Global Positioning System (GPS) receiver, enables the mobile station 16 to determine its current location based on positioning signals transmitted by a GPS satellite. The receiver 50 requires an antenna, which may be separate from or integrated with the mobile station's antenna. The positioning receiver 50 could also be designed to receive similar positioning signals from terrestrial sources.

Figure 2B:
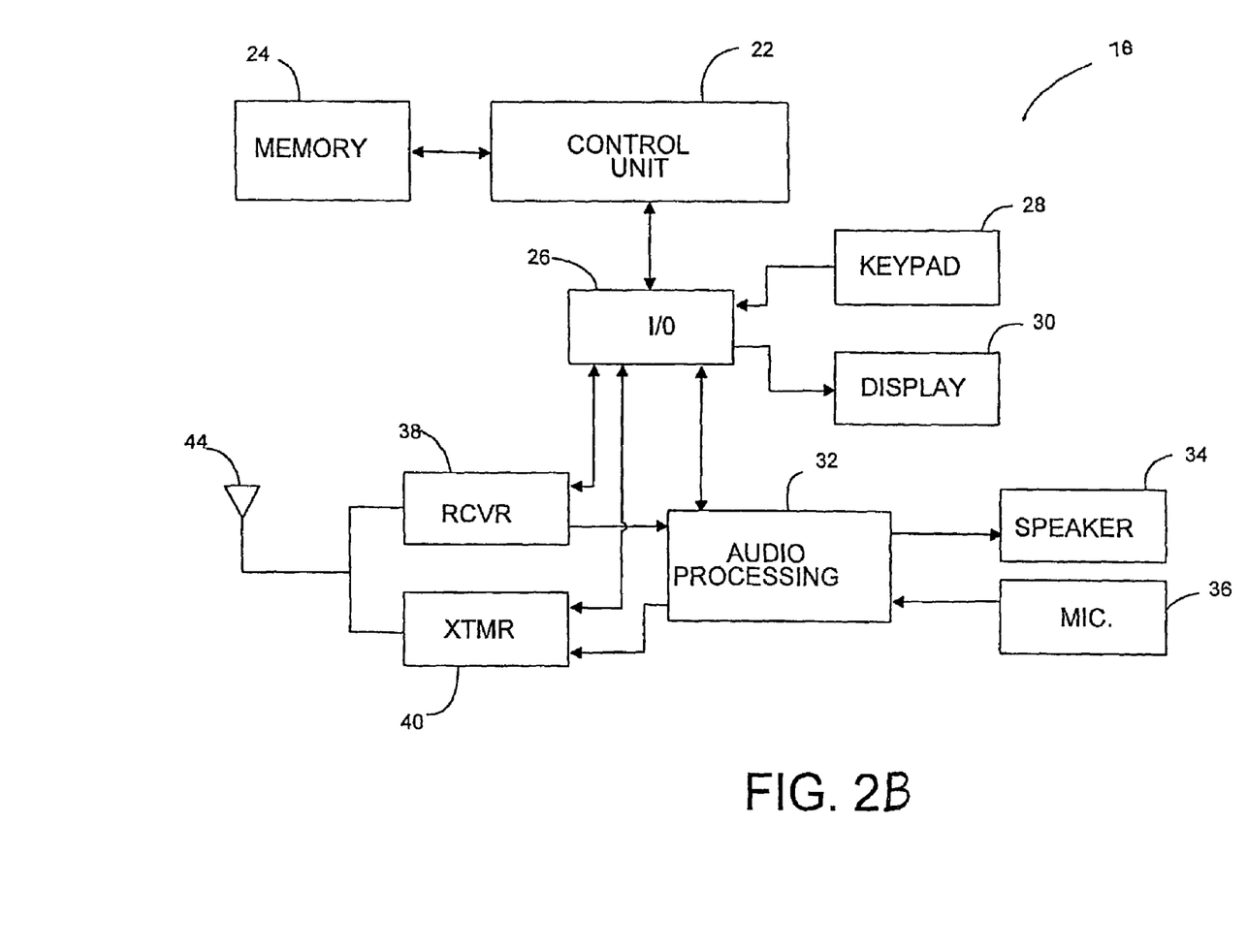
FIG. 2B is a block diagram of an alternative embodiment of a mobile terminal.

Alternatively, the mobile station 16 may be configured to determine a relative position or mobility based on signals received from one or more base stations 12. For example, the cellular system may determine the mobile station's position or mobility using triangulation or similar positioning techniques and then download the mobile station's position to the mobile station 16. Alternatively, the mobile station 16 may use its communication and control electronics to monitor signals received from one or more base stations and calculate its relative position or mobility, also using triangulation or like techniques. Such a system is shown in FIG. 2B without a separate receiver for positioning estimating.

The mobile station 16 is programmed to periodically monitor selected control channels in adjacent cells and to perform channel quality measurements on those channels. Channel quality measurements may include received signal strength, bit error rate (BER), and word error rate (WER), as well as other parameters. Channel quality measurements may, for example, be transmitted by the mobile station 16 to the base station 12 to assist the base station 12 in making hand-off determinations. Hand-offs made by the base station 12 on the basis of channel quality measurements made by the mobile station 16 are known as mobile assisted handoffs. Channel quality measurements may also be used by the mobile station for cell reselection. Cell reselection may occur, for example, when the mobile station 16 is in a idle mode or engaged in a packet data session.

According to the present invention, the mobile station 16 is programmed to vary the frequency at which channel quality measurements are made based on the position of the mobile station 16, or some function of that position. For example, the mobile station 16 may be programmed to determine its position relative to the currently serving base station 12 and vary the frequency of the channel quality measurements as a function of the distance from the serving base station 12. In this case, the frequency of channel quality measurements would increase as the distance from the serving base station increased. In another embodiment, the mobile station 16 may determine its position relative to the serving base station 12 and a target base station 12 in a neighboring cell and vary the frequency of measurement as a function of the distance from both base stations 12. In this case, the frequency of reporting may be dependent on the ratio of the distances between the serving base station and the target base station 12. Another embodiment would be to monitor the position of the base station 12 and vary the frequency of channel quality measurements based on the mobility of the mobile station 16. For purposes of this application, the term mobility is defined to be any function of position and time, such as the rate of change in position of the mobile station 16 over time. Another example of mobility would be the amount of time the mobile station 16 stays in one position. In this case, the frequency of channel quality measurements would increase with increasing mobility.

While the disclosed embodiment relates to the performance of channel quality measurements by the mobile station, those skilled in the art will recognize that the present invention could be adapted for other channel monitoring functions, or any other periodic tasks that need to be performed by the mobile station. Also, those skilled in the art will recognize that the frequency of the channel monitoring functions could also be dependent on other factors, in addition to position or mobility.

By adjusting the frequency of reporting in an intelligent manner, it is possible to minimize the amount of frame stealing required during active mode and reduce monitoring activities during idle mode to conserve energy. Importantly, the measurement procedures according to the present invention avoid or minimize any impact on the quality of handoff or cell reselection procedures. In essence, handoffs and cell reselection should take place at about the same time and to the same cell as that provided by existing channel selection procedures. The primary difference is reduced frame stealing and decreased energy consumption.

To implement the present invention, the mobile station 16 must estimate its position periodically. The need to estimate position may potentially conflict with the objective of saving battery life while in idle mode. However, there may be other applications that dictate the need for position estimates, such as for acquiring a position used in emergency calling. Furthermore, the frequency of making position estimates may be one or more magnitudes less than channel selection measurements. If no mobility is detected and hence, very infrequent neighbor list measurements and position estimates are made, there is a net gain in battery life. During active mode, the object is to minimize required frame stealing and not the frequency of measurement per se. Hence, during active mode, the battery drain due to performing position estimates is a secondary issue.

Figure 5:
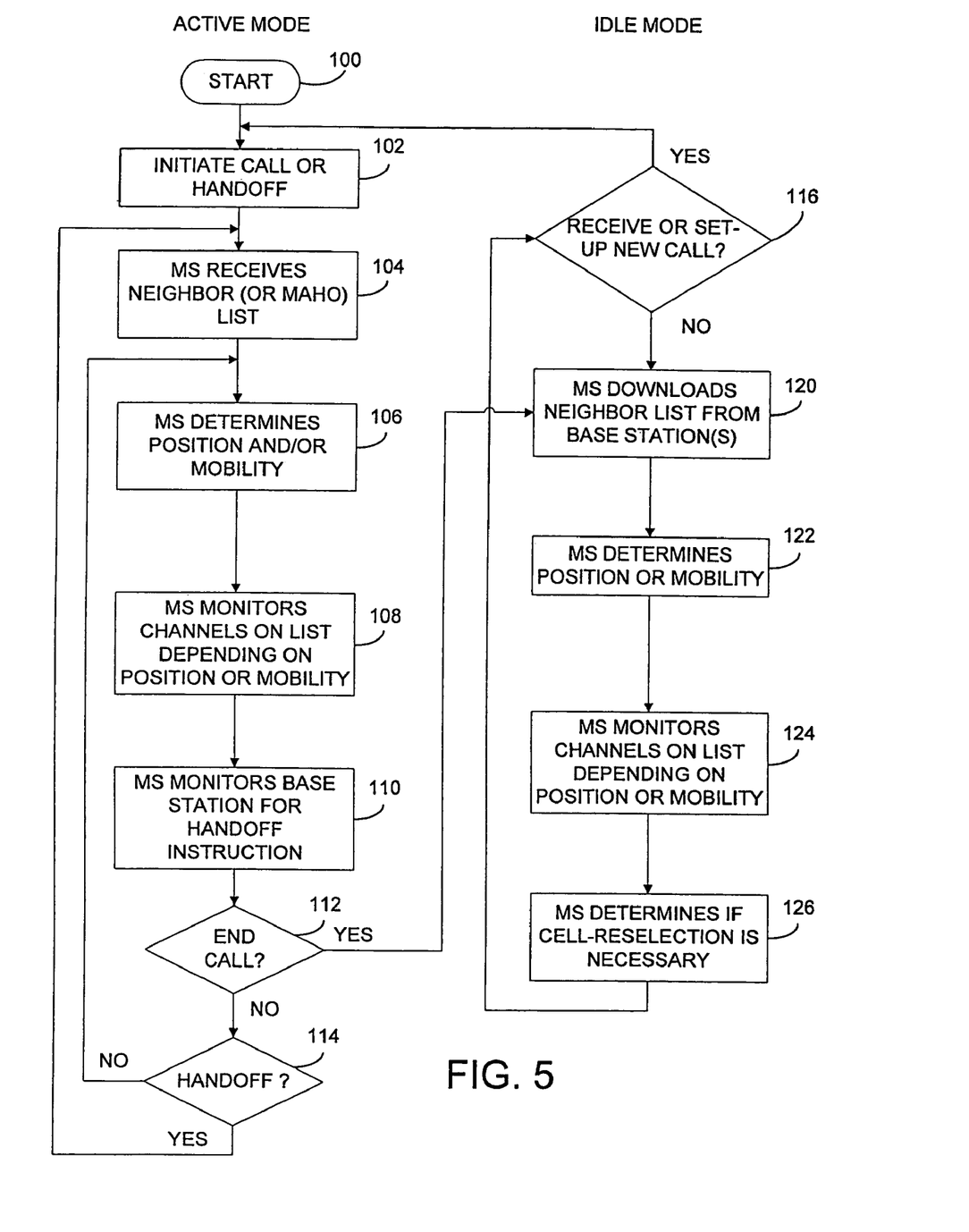
FIG. 5 is a flow chart outlining the basic process for improving channel selection and monitoring during active and idle modes.

The basic process for improving channel selection and monitoring during active and idle modes is outlined immediately below in association with the flow chart of FIG. 5. The process begins (block 100) when a call is initiated or a handoff occurs (block 102). A mobile station 16 (MS) receives a neighbor list or MAHO list (block 104) outlining channels associated with surrounding cells, which are to be monitored by the mobile station 16. At any point during this process, the mobile station 16 periodically determines its estimated position and/or mobility (block 106). Notably, position or mobility determinations need not occur at the channel monitoring frequency or a frequency dependent on how often the mobile station 16 monitors channels from the neighbor or MAHO list. Also, it should be noted that position estimating is a periodic function and that the frequency at which the position of the mobile station 16 is updated could also vary in accordance with the present invention. Thus, the mobile station 16 could be programmed to perform additional calculations to update the frequency of position estimating after updating its current position, or to determine a time at which to update its current position.

While the mobile station 16 is actively handling a call, it monitors the channels on the MAHO list at a frequency depending on the mobile station's position or mobility (block 108). Preferably, the position or mobility determinations also bear on which channels to monitor, and possibly, which to avoid. Notably, the frequency at which the mobile station 16 monitors these channels may also be influenced by other factors, such as the current state of the call, the type of call, etc. Further details regarding these factors are outlined below. During this time, the mobile station 16 also monitors signals from the base station serving the mobile station 16 for handoff instructions (block 110). Assuming the call continues, the mobile station 16 will determine whether or not to change channels based on the handoff information from the base station, or in certain proposed systems such as DECT, the mobile station 16 may make the determination independently and signal the cellular system accordingly (block 114). As noted above, in most digital systems, the handoff decision is made by the serving base station with the assistance of the mobile station 16.

If a handoff (block 114) is not required, the mobile station 16 repeats the process of determining its position or mobility and continues monitoring the channels on the neighbor or MAHO list based thereon. If a handoff is required, the system typically downloads a new MAHO list and repeats the above processes accordingly.

When a call ends (block 112), the mobile station 16 typically changes from an active mode of operation to an idle mode. During idle mode, the mobile station 16 is still served by a base station in the sense that it selects a base station for registration purposes and transmits signals to the serving base station to effect such registration. When idle, the mobile station 16 typically determines when cell reselection is necessary and effects new registration any time channels or cells are changed.

Assuming a call is not received or the mobile station 16 is not required to set up a new call (block 116), the mobile station 16 downloads neighbor lists from the serving base station, and perhaps, lists from other base stations providing signals of sufficient strength and quality (block 120). During this process, the mobile station 16 periodically determines its position or mobility (block 122). Based on this determination, the mobile station 16 monitors the channels from the neighbor list with a frequency depending position or mobility (block 124). As discussed further below, the mobile station 16 may receive access to information bearing on the position of the serving and surrounding base stations as well as coordinates defining areas served by select channels within a cell. Given certain or all of this information, the mobile station 16 may control the frequency of measurements and the channels to measure based on its relative position to a single base station, relative position between two base stations, or its relative position within a defined area or cell.

When mobility is a variable controlling these measurements, the mobile station 16 may base these measurements on mobility alone, relative to a single base station 12, relative to multiple base stations 12, or combine a mobility determination with relative position to one or more areas or cells. The frequency at which these channels are monitored or which channels are monitored are also subject to influence by other factors, such as signal strength, signal quality, etc. The mobile station 16 then determines whether or not to change serving cell for cell reselection based on the monitoring of the channels on the neighbor list and the serving base station (block 126). If cell reselection occurs, the mobile station 16 may be required to register with the cellular system in order to identify its presence in the new paging area if necessary. The process will repeat until a new call is arranged or the phone is completely powered down.

The mobile station 16 communicates with the base station 12 using a communications channel. The term channel can have various meanings depending on the context. In general, an RF channel refers to a single allocation of a contiguous spectrum. In the AMPS and IS-136 systems, an RF channel is a 30 kHz allocation in the 850 MHz band or the 1900 MHz band. In GSM, an RF channel is a 200 kHz in the 900 or 1950 MHz bands and 1800 MHz for GSM. The term channel may also refer to an information channel (control channel or traffic channel) in a TDMA or CDMA system. In a TDMA system, an information channel comprises one or more time slots on an RF channel that are allocated to a mobile station 16 for transmitting and receiving. In a CDMA system, an information channel is distinguished by an unique coding scheme that further subdivides the RF channel. For purposes of this application, the term communications channel or channel will generally refer to an information channel, which could be the same as an RF channel in some systems.

There are essentially two types of cellular communication techniques, circuit-switched and packet-switched. A circuit-switched connection is a circuit connection that is established and maintained, usually on demand, between two or more stations to allow the exclusive use of the circuit until the connection is released. A packet-switched connection is a logical connection that is established between two or more stations to allow the routing and transfer of data in the form of packets. The channel is occupied during the transmission of a packet only. Upon completion of the transmission, the channel is made available for the transmission of other packets for the same or other stations. Channel selection procedures typically vary depending on whether circuit-switched or packet-switched connections are used.

For circuit-switched data communications, mobile-assisted handoffs are typically used where the mobile assists with measurements and the cellular system controls channel allocation. Since the mobile station 16 is continuously allocated an uplink channel, as for a voice call, measurement reports are typically sent on a call-associated control channel. In contrast, during a packet data session, the mobile station 16 does not transmit for extensive periods. During these packet sessions, sending a mobile-assisted handoff report would unnecessarily use uplink channels shared by multiple mobile stations 16. Thus, packet data protocols typically specify that the mobile station 16 finds the best channel and the cellular system relinquishes control in order to save bandwidth.

The process of allocating the mobile station 16 to the best base station 12 during an active packet data session is similar or identical to the cell reselection process while in idle mode. A neighbor list is received from the cellular system and the mobile system measures and evaluates the candidate cells based on channel quality. In order to maintain conciseness and readability, the terms neighbor list and MAHO list are used to refer to any type of measurement list identifying channels or base stations to monitor. These terms are used to facilitate an understanding of the invention by associating a neighbor list with idle operation and packet data operation and a MAHO list for active operation. However, these therms are interchangeable and each may be used to describe measurement lists for active and idle modes. As such the disclosure and claims should be interpreted accordingly. Nothing prevents a hybrid solution in which the mobile station 16 performs cell reselection measurement and selection and the cellular system overrides the default cell reselection process by sending a handoff command. Notably, the GPRS packet data protocols in GSM systems support mobile station 16 and network-initiated cell reselection.

There are implications for letting the mobile station 16 evaluate neighboring cells. The particular implication depends on whether the mobile station 16 is operating in active or idle mode. For TDMA systems operating in active mode, the number of time slots per TDMA frame is large enough such that there is ample amount of time for the mobile station 16, during non-assigned time slots, to perform neighbor list (or MAHO list) measurements. However, for multi-slot operation, such as when all slots are allocated, there is no spare time for neighbor list or MAHO list measurements. During idle mode, availability of time slots is not an issue. The primary objective for the mobile station 16 is to minimize current consumption while successfully monitoring the assigned communication channel and performing neighbor list measurements.

Numerous techniques exist for minimizing the impact of these constraints. For example, when mobile station 16 is operating in active mode and a time is available for MAHO list measurements, either a second receiver is used to assist in communications or the mobile station 16 stops transmitting or receiving data on one or more slots and uses the slots to perform the list measurement. The latter is referred to as frame stealing, which inherently reduces communication throughput.

Communication protocols include retransmission of lost data, but this reduces the efficiency of the system. The tradeoff is typically loss of throughput versus measurement accuracy.

Frame stealing is typically one of two types: scheduled stealing or wild stealing. For scheduled stealing, the system sends time information specifying when the mobile station 16 is allowed to or requested to perform neighbor or MAHO list measurements; the system stops sending data during that time frame. In contrast, wild stealing is when the mobile system makes an autonomous decision to perform neighbor or MAHO list measurements without providing any information to the cellular system. Arming the cellular system with information relating to when the mobile station 16 is not available for data reception and transmission improves system throughput. Frame stealing is adaptable to either circuit-switched or packet-switched connections.

For circuit-switched connections, there is typically a minimum number of measurements required for any given time period and for each entry in a measurement list in order to maintain the quality of the channel quality measurement (CQM) report, if it is addressed at all in the protocol/standard. Further, a maximum number of frames are allowed to be stolen. This is done to maximize the time the mobile is allowed to make specific measurements in order to put a limit on the reduction of data throughput. These are conflicting requirements, which require efficient use of the mobile station 16 to provide scheduled or wild stealing.

Both types of stealing are also applicable for packet-switched connections. Further details regarding scheduled and wild frame stealing in packet-switched connections is provided in U.S. patent entitled Apparatus and Method for Signal Strength Measurement in a Wireless Communication System, which is incorporated herein by reference.

Both GSM (GPRS) and ANSI-136 incorporate some or all of the aspects (i.e. stealing) mentioned above in order to handle neighbor and MAHO list measurements in active mode while in multi-slot operation. For a CDMA system, the availability of time for neighbor and MAHO list measurements is typically not an issue as long as these measurements are restricted to channels on the same frequency as the communication channel.

The neighbor list and MAHO list may contain sub-lists for a defined area. That is, the neighbor list or MAHO list may incorporate one or more area definitions defining at least partially distinct areas. A sub-list would then be associated with each area definition. Each sub-list may contain different neighbor and MAHO entries or one entry may appear in several sub-lists. An example format of a list may be: area definition 1, channel entries for area 1, attributes for cell 1; area definition 2, channel entries for Area 2, attributes for cell 2; ..., area M definition, channel entries for area M, attributes for cell M. The attributes may include cell identity, service capability and the exact position of the base station's transmitter for the given cell. U.S. Pat. No. 5,353,332 relates to providing information about other cells and is incorporated herein by reference.

Figure 3:
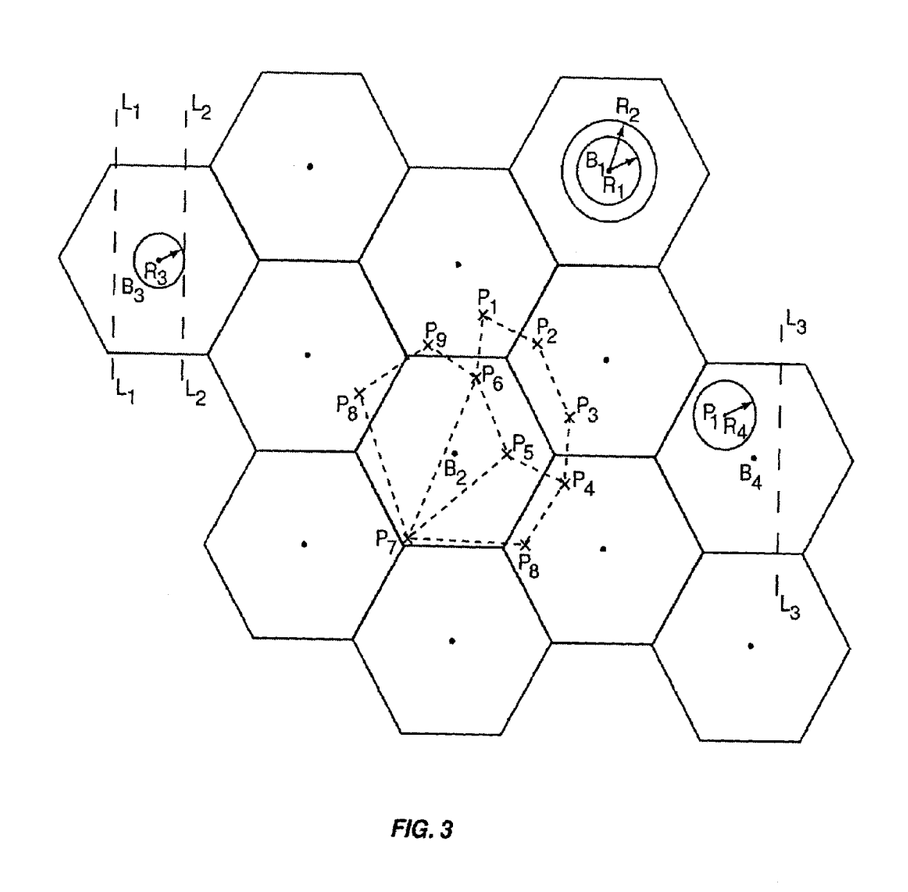
FIG. 3 is a representation of cellular layout having omnidirectional cells with distinct areas defined therein.
Figure 4:
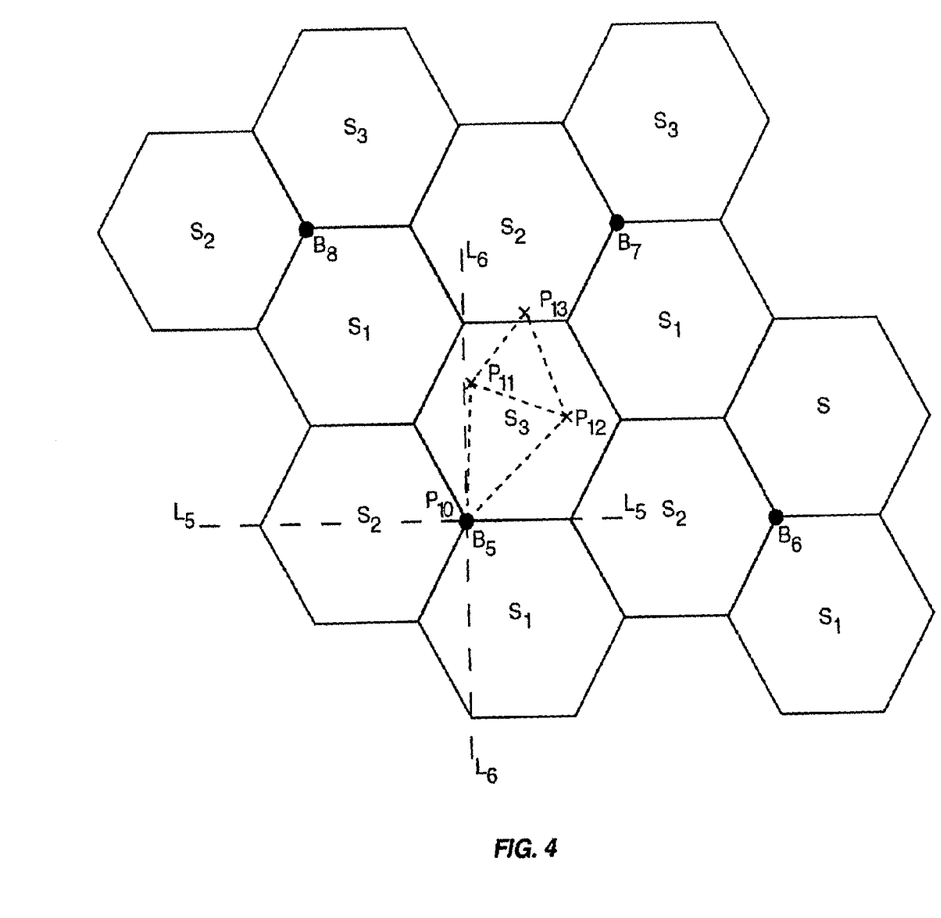
FIG. 4 is a representation of cellular layout having sectorized cells with distinct areas defined therein.

FIGS. 3 and 4 show exemplary sub-division of cells into multiple areas. A specified area, according to the information transmitted from the cellular system, may overlap and cross the hypothetical cell areas defined as hexagons. Turning now to FIG. 3 in particular, omni-directional cells are assumed. For base station B1, there are three areas. The first area is the area with radius R1, the second is the area within radius R2, but not within the first area defined by R1. The third area is outside the circle defined by radius R2. The base station B1 transmits information defining radius R1, radius R2, and the position of its transmitter.

Base station B2 is configured differently and transmits coordinates in groups to define areas. The first area is defined within coordinates P1, P2, P3, P4, P5 and P6. The second area is defined within coordinates P5, P6 and P7. A third area is defined within coordinates P5, P6, P7, P8 and P9. A fourth area is any position not covered by the other three areas. Preferably, the base station B2 transmits the coordinates P1 through P9 and the above area definitions to the mobile station 16.

Another configuration is shown associated with base station B3 where four areas are defined. The first area is defined by radius R3. A second area is to the west (left) of line L1, and a third area is defined by the area east (right) of L2. A fourth area is defined by the remaining portions not covered by the three other areas.

Yet another exemplary configuration is shown associated with base station B4 where three areas are defined. The first area is east (right) of the line L3, and a second area is west (left) of the line L3. A third area is defined by radius R4 from a particular coordinate P1. Mobile stations 16 not subscribing to the system simply skip measuring those entries. A configuration similar to that defined by B4 may also be of interest when private systems are located within a cell. Thus, the channel entries for the area associated with radius R4 may include one or more channels belonging to private systems. Base station B4 may transmit the coordinates, line definitions and groupings, as do the other base stations.

Furthermore, for the area defined by radius R4, the identity and definitions of private systems may be included with the channels to measure.

FIG. 4 is exemplary of systems using sectorized cells. As depicted, each base station has three sectors: S1, S2 and S3. For base station B5, one area is defined by the coordinates P11, P12 and P13. Another area is defined with coordinates P11, P12 and P10, the latter of which is the position of the base station. Yet another area is defined west (left) of line L6 and north (above) line L5. Another area is defined east (right) of L6 and north (above) line L2, but not defined by the first two areas of coverage. Two additional areas are defined using the remaining coordinates defined by the lines L5 and L6. These coordinates, line definitions and the interpretations are transmitted by base station B1.

As exemplified above, areas of interest may be defined in many different forms. For example, a set of coordinates and hypothetically connected constituents in an area. Another example is a distance from the position of a cell thereby defining areas as concentric circles. The center position of the receptive cell may also be included as a defined area.

In a preferred embodiment, once a mobile station 16 has determined its position it may 1) measure all the entries associated with the area containing the mobile station 16 based upon its position; 2) measure other entries, such as areas neighboring the identified area, with a lesser frequency; or 3) not measure some entries at all. The latter alternative is preferably saved for non-adjacent areas. These decisions are preferably made in association with information pertaining to cell configuration, such as defined by the areas exemplified above. Importantly, any input or information from which position or mobility may be derived is equally well suited for both active and idle modes of operation.

The degree of measurement relaxation or change may depend on several factors alone or in combination with one another. These factors include change in position between position estimates; estimated speed, relative position of the mobile station 16 to a serving cell and respective neighboring cells, or time spent in a current state. The latter of which is preferably used while other inputs, such as position or speed are approximately constant. Certain of these factors may be beyond any currently specified protocol standards or rules of measurement, e.g. broadcasting area specific NL. This information may be transmitted to the mobile station 16 using sub-lists and used in association with specified measurement rules.

If mobility is determined, measurement procedures may be affected in numerous ways. The most preferable of these would be to: 1) immediately revoke all measurement relaxation; 2) gracefully revoke relaxation; 3) revoke measurement relaxation dependent on the degree of mobility; or 4) revoke measurement relaxation dependent on the relative position of the mobile station 16 to a current and/or respective neighboring cells. For example, if the mobile station 16 is very close to the base station of the serving cell, it will typically take a while for the mobile to reach a signal strength border and before a geographic or more preferable the radio border reselection would take place. If the mobile station 16 has the position of the neighboring base station, it can calculate the time required with an assumed speed before it reaches the cell border. This time, assuming a conservatively high speed, can be used to set the degree of measurement relaxation and how quickly to react when mobility is detected.

As another example, assume the mobile station 16 is engaged in a packet data session and is multi-slot capable, such as an eight-slot GPRS mobile station 16. As such, the mobile station 16 must sometimes stop Rx or Tx or both data in order to fulfill a required neighbor cell measurement procedure. This necessarily results in reduced data rate throughput. However, for most instances of packet data operation resulting in a high data transfer rate, the user is not traveling. For example, a user could download information from the Internet while sitting in an airport, meeting room, hotel lobby or office. The mobile station 16 may use position estimates over time to determine that it is not moving. The likelihood that a channel change is required, which is the reason to make these measurements in the first place, is relatively low. The longer the mobile station 16 determines that it is not moving, the more likely that for the next period of time 9 there will not be any movement and channel selection measurements can be further relaxed. Thus, the time the mobile station 16 stays in a current state or position may affect the frequency of cell measurements. Based on the position or mobility within a cell or an area within a cell, the mobile may change the frequency channel measurements are made and, perhaps, the cells that are monitored.

It is worth noting that cell reselection may take place when a mobile station 16 is well within the cell's geographic border because of signal propagation effects caused by shadowing from buildings and hills. Furthermore, in a hierarchical cell structure, cell reselection may take place between cells that transmit from the same position. To this end, a safety margin is preferred when activating and deactivating the measurement relaxation. The mobile station 16 may use measurements of neighboring cells to predict, using relative signal strength, how close it is to a potential cell reselection or handover.

As noted, in circuit switched mode the cellular system typically determines which cell or channel to use. The system may handoff a mobile station 16 because of load sharing between base stations or sectors therein or the channel may be subject to severe interference for which an intra-cell handoff may be advantageous. In principal, the mobile should not second-guess the system. Thus, care should be taken when determining how aggressively the measurement relaxation is implemented by the mobile station 16 vendor while in circuit switched mode.

In idle mode the situation is more easily controlled since the only things that affect cell reselection are the measurements made by the mobile station 16 and a few static parameters sent over broadcast channels. Thus, in idle mode, the mobile can make more reliable predictions. For example, the mobile station 16 may determine that if a neighbor list entry is 10 dB stronger than the current channel, then it will make a cell reselection. It is important to realize that the inputs described above, in addition to affecting cell reselection, may also affect the frequency of making position estimates during active and idle modes to the extent other applications provide.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method of channel selection for a mobile station comprising:
   determining a position of said mobile station;
   periodically performing channel quality measurements of signals transmitted from one or more base stations, wherein the frequency of performing said channel quality measurements is based on said position of said mobile station independent of the speed of said mobile station; and wherein said frequency of performing said channel quality measurements is a function of the relative position of said mobile station with respect to a first base station serving said mobile station and at least one additional base station.

2. The channel selection method of claim 1 wherein the position of said at least one additional base station is transmitted to said mobile station by said first base station.

3. The channel selection method of claim 2 wherein the position of said at least one additional base station is included in a neighbor list transmitted to said mobile station by said first base station.

4. The channel selection method of claim 1 wherein said channel quality measurements are performed by said mobile station while said mobile station is engaged in a packet switched call.

5. The channel selection method of claim 1 wherein said channel quality measurements are performed by said mobile station while said mobile station is engaged in a circuit switched call.

6. The channel selection method of claim 1 wherein said mobile station uses said channel quality measurement for cell reselection.

7. The channel selection method of claim 1 further including transmitting said channel quality measurements from said mobile station to a first base station serving said mobile station.

8. The channel selection method of claim 7 further including making hand-off determinations at said first base station based on said channel quality measurements.

9. A method of channel selection for a mobile station comprising:
determining a position of said mobile station;
periodically performing channel quality measurements of signals transmitted from one or more base stations, wherein the frequency of performing said channel quality measurements is a function of said position of said mobile station; and
wherein said frequency of performing said channel quality measurements is a function of the length of time said mobile station remains in said position.

10. The channel selection method of claim 9 wherein said frequency of performing said channel quality measurements is a function of the relative position of said mobile station with respect to a first base station serving said mobile station.

11. The channel selection method of claim 9 wherein said channel quality measurements are performed by said mobile station while said mobile station is in an idle mode.

12. A method of determining the position of a mobile station comprising:
determining a position of said mobile station at a first time instant;
updating said position periodically, wherein a frequency of said updating is a function of said position of said mobile station;
wherein said frequency of updating said position is a function of the mobility of said mobile station; and
wherein said frequency of updating said position is a function of the rate of change of said position of said mobile station.

13. A method of determining the position of a mobile station comprising:
determining a position of said mobile station at a first time instant;
updating said position periodically, wherein a frequency of said updating is a function of said position of said mobile station;
wherein said frequency of updating said position is a function of the mobility of said mobile station; and
wherein said frequency of updating said position is a function of the length of time said mobile station remains in said position.

14. A mobile station comprising:
a transceiver to transmit and receive radio frequency signals;
a signal processor operatively connected to said transceiver to periodically perform channel quality measurements on selected signals received by said transceiver;
control logic to control said signal processor and said transceiver to vary the frequency of performing said channel quality measurements based on the position of said mobile station independent of the speed of said mobile station; and
wherein said control logic varies the frequency of performing said channel quality measurements based on the relative position of said mobile station with respect to a first base station serving said mobile station and at least one additional base station.

15. The mobile station of claim 14 further including a positioning receiver to determine the position of said mobile station.

16. A mobile station comprising:
a transceiver to transmit and receive radio frequency signals;
a signal processor operatively connected to said transceiver to periodically perform channel quality measurements on selected signals received by said transceiver;
control logic to control said signal processor and said transceiver to vary the frequency of performing said channel quality measurements as a function of the position of said mobile station; and
wherein said control logic varies the frequency of performing said channel quality measurements based on the length of time said mobile station remains in said position.

17. The mobile station of claim 16 wherein said control logic varies the frequency of performing said channel quality measurements based on the relative position of said mobile station with respect to a first base station serving said mobile station.

18. A mobile station comprising:
a transceiver transmitting and receiving radio frequency signals;
a positioning receiver periodically determining a position of said mobile station;
control logic controlling said transceiver and said positioning receiver, wherein said control logic varies the frequency of determining said position of said mobile station as a function of said position; and
wherein said control logic varies the frequency of determining said position of said mobile station based on the length of time said mobile station remains in said position.

19. A method of controlling a mobile station comprising:
determining a position of said mobile station;
performing a periodic task, wherein the frequency of performing said task is based on said position of said mobile station independent of the speed of said mobile station; and wherein said frequency of performing said periodic task is a function of the relative position of said mobile station with respect to a first base station serving said mobile station and at least one additional base station.

20. A method of controlling a mobile station comprising:
   determining a position of said mobile station;
   performing a periodic task, wherein the frequency of performing said task is a function of said position of said mobile station; and
   wherein said frequency of performing said periodic task is a function of the length of time said mobile station remains in said position.

21. The control method of claim 20 wherein said frequency of performing said periodic task is a function of the relative position of said mobile station with respect to a first base station serving said mobile station.

* * * * *